(12) United States Patent
Mayer

(10) Patent No.: US 9,457,487 B2
(45) Date of Patent: Oct. 4, 2016

(54) HIGH PERFORMANCE SLICING APPARATUS WITH AT LEAST ONE REMOVABLE CONVEYOR BELT UNIT

(71) Applicant: Textor Maschinenbau GmbH, Wolfertschwenden (DE)

(72) Inventor: Josef Mayer, Memmingerberg (DE)

(73) Assignee: TEXTOR MASCHINENBAU GMBH, Wolfertschwenden (DE)

( * ) Notice: Subject to any disclaimer, the term of this patent is extended or adjusted under 35 U.S.C. 154(b) by 0 days.

(21) Appl. No.: 14/094,136

(22) Filed: Dec. 2, 2013

(65) Prior Publication Data

US 2014/0174891 A1 Jun. 26, 2014

(30) Foreign Application Priority Data

Dec. 3, 2012 (DE) .......................... 10 2012 222 042
Apr. 12, 2013 (DE) .......................... 10 2013 206 510

(51) Int. Cl.
  *B65G 15/10* (2006.01)
  *B26D 7/06* (2006.01)
  *B26D 7/32* (2006.01)
  *B65G 15/00* (2006.01)

(52) U.S. Cl.
  CPC .............. *B26D 7/0625* (2013.01); *B26D 7/32* (2013.01); *B26D 2210/02* (2013.01); *B65G 15/00* (2013.01)

(58) Field of Classification Search
  CPC ....... B26D 7/0625; B26D 7/32; B65G 15/12
  USPC ......................................................... 198/817
  See application file for complete search history.

(56) References Cited

U.S. PATENT DOCUMENTS

| | | | | |
|---|---|---|---|---|
| 3,878,937 | A * | 4/1975 | Glaser et al. | 198/835 |
| 5,871,085 | A * | 2/1999 | Yagi | 198/835 |
| 5,934,449 | A * | 8/1999 | Dolan | 198/853 |
| 5,964,340 | A * | 10/1999 | Dolan | 198/853 |
| 5,967,296 | A * | 10/1999 | Dolan | 198/853 |
| 6,371,283 | B1 | 4/2002 | Manchester | |
| 6,509,533 | B1 * | 1/2003 | Tanaka | B65G 15/00 177/126 |
| 6,959,803 | B1 * | 11/2005 | Layne et al. | 198/600 |
| 7,308,979 | B1 * | 12/2007 | Layne et al. | 198/600 |
| 7,909,159 | B1 * | 3/2011 | Zats | B65G 15/12 198/586 |
| 2008/0073185 | A1 | 3/2008 | Brayman et al. | |

FOREIGN PATENT DOCUMENTS

| | | |
|---|---|---|
| DE | 102008024314 A1 | 11/2009 |
| DE | 102010001969 A1 | 8/2011 |
| EP | 1584580 A1 | 10/2005 |
| EP | 1816092 A1 | 8/2007 |
| EP | 1877328 B1 | 11/2008 |
| EP | 2239108 A2 | 10/2010 |
| EP | 2357063 A1 | 8/2011 |
| GB | 2041315 A | 9/1980 |
| WO | 2006103348 A1 | 10/2006 |

OTHER PUBLICATIONS

Search Report regarding related Applcation No. 10 2013 206 510.8; dated Nov. 8, 2013; 5 pgs.
English Translation of German Search Report dated Nov. 8, 2013; DE Pat. App. No. 10 2013 206 510.8; 6 pgs.
European Search Report for European Application No. 13195533.8 dated Dec. 10, 2014.

* cited by examiner

*Primary Examiner* — William R Harp
(74) *Attorney, Agent, or Firm* — Cantor Colburn LLP

(57) ABSTRACT

The invention relates to a slicing apparatus for food products, in particular to a high-performance slicer, having at least one belt conveyor which is configured as a removable conveyor belt unit.

24 Claims, 15 Drawing Sheets

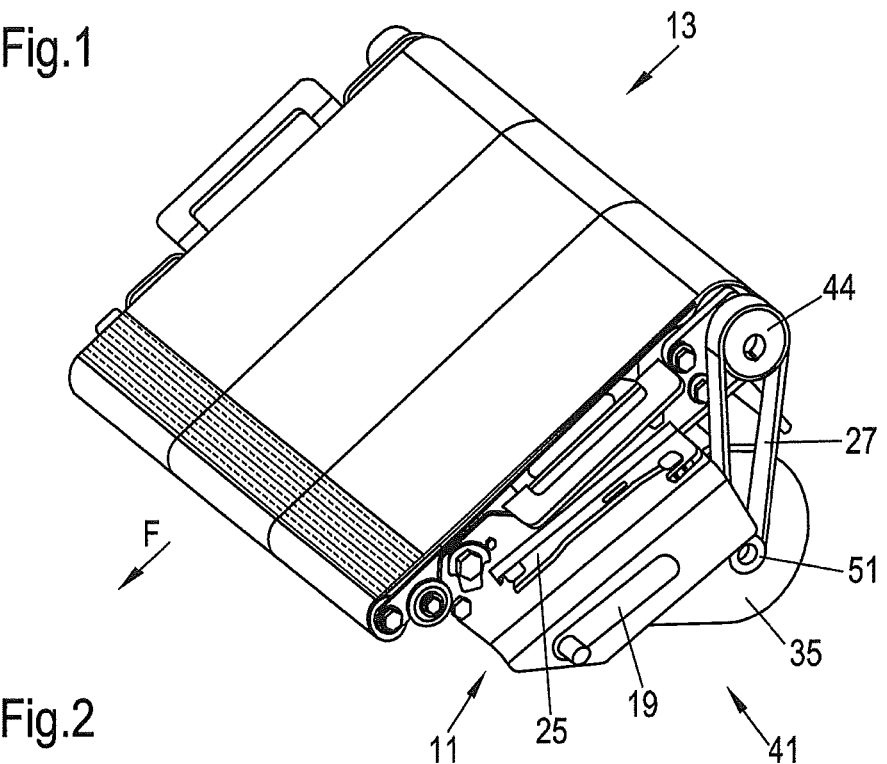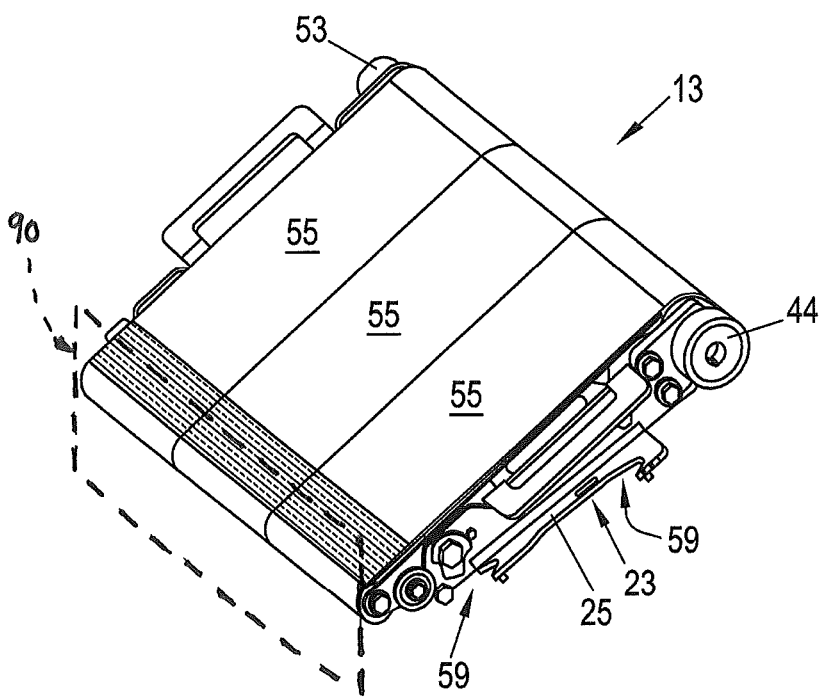

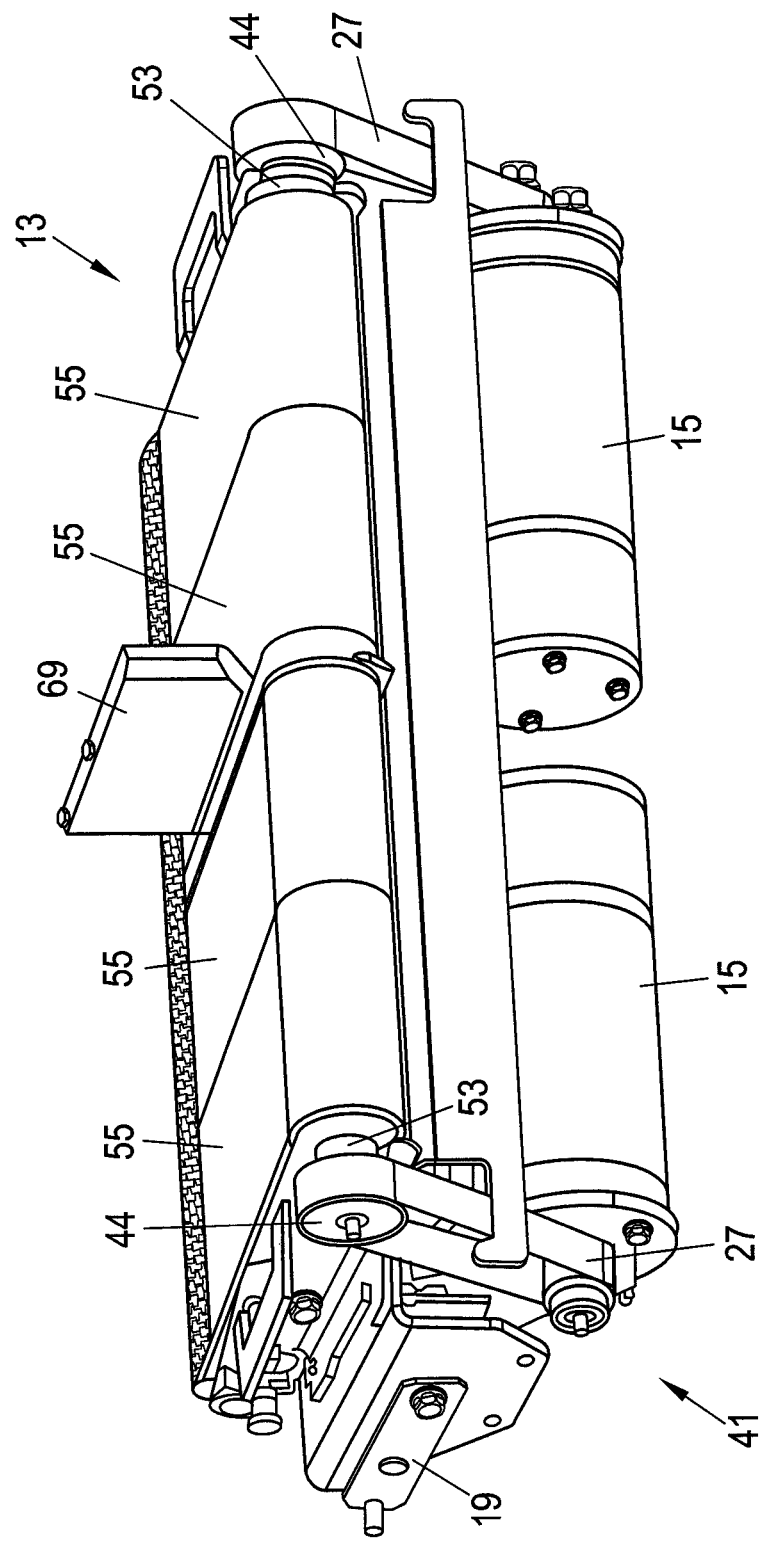

HIGH PERFORMANCE SLICING APPARATUS WITH AT LEAST ONE REMOVABLE CONVEYOR BELT UNIT

CROSS-REFERENCE TO RELATED APPLICATIONS

This patent application claims priority to German Patent Application Serial No. 102012222042.9, filed Dec. 3, 2012 and German Patent Application Serial No. 102013206510.8, filed Apr. 12, 2013, which are incorporated herein by reference in their entirety.

FIELD OF THE INVENTION

The invention relates to a slicing apparatus for food products, in particular to a high-performance slicer, having at least one belt conveyor.

BACKGROUND

Products in particular have to be supplied to a cutting plane in high-performance slicing apparatus so that the products can be cut into slices. The cut-off slices then furthermore have to be grouped into portions and subsequently transported away from the cutting zone. Actively driven conveyor belts are normally used for this conveying work. They are either belt conveyors or band conveyors having relatively wide, flat belts or bands or strap conveyors having a plurality of relatively narrow individual straps which can in particular have a circular cross-section.

Those conveyors which supply the products to the cutting plane should normally reach up to just before the cutting plane to ensure an ideal traction of the products. These conveyors are therefore often also called traction belts.

Those conveyors which collect the cut slices and group them to form portions of a plurality of slices are usually called portioning belts. At least two conveyors are often used which are arranged after one another to be able directly to start the placing of new slices on the first conveyor again after the transfer of the portion from the first conveyor to the second conveyor. These at least two conveyors arranged after one another will also together be called a "portioning belt" within the framework of the present disclosure even though a plurality of individual conveyors arranged after one another are provided.

The invention is not restricted to such traction belts or portioning belts. The invention can in principle be realized at any kind of belt conveyor.

In practice, both the supply belts (in particular the traction belts) and the transport-away belts (in particular the portioning belts) are customarily greatly contaminated during the operation of a slicing apparatus. It is therefore necessary to clean these conveyor belts daily, frequently even several times daily. For this purpose, a removal of the belt bands or of the transport straps is normally required to be able to carry out a thorough cleaning.

It is known from the prior art to make possible such a removal in that the conveyors are suspended at one side at an apparatus frame to achieve a simple removal of the belt or band. In this respect, the conveyors remain in the apparatus during the cleaning. The disadvantage of such a procedure is that very huge belt racks are required as the width of the belt conveyor increases. Furthermore, a lot of room is required at the side next to the conveyor to remove the respective conveying means, for example the band, with a conveyor remaining at the apparatus.

Conveyors are furthermore known which can be removed simply including the respective conveying means. However, these conveyors are typically coupled to a drive unit via a coupling or via a coupling unit. This means that a coupling which establishes the connection to a drive motor in operation is seated on the drive roller of the conveyor. However, a very large width results due to such a type of construction since either the drive motor has to be arranged axially beside the drive roller of the conveyor or it is necessary to arrange a coupling unit with a bearing axially to the drive roller of the conveyor, with this coupling unit then having to be coupled to a drive motor via a further connection, e.g. a toothed belt.

Both variants result in a large width and moreover do not make it possible to connect a plurality of drive to a removable conveyor.

SUMMARY OF THE INVENTION

It is a feature of the invention to provide an apparatus of the initially named kind which does not have the mentioned disadvantages and which in particular makes a cleaning possible which is as simple as possible with a space-saving and inexpensive manner of construction.

In accordance with an embodiment of the invention, the belt conveyor is designed as a removable conveyor belt unit.

Embodiments of the invention are also set forth in the dependent claims, in the description and in the drawings.

In accordance with an embodiment, the conveyor belt unit is arranged before the cutting plane, viewed in the conveying direction, and is in particular configured as a traction belt. In accordance with an alternative embodiment, the conveyor belt unit is arranged behind the cutting plane, viewed in the conveying direction, and is in particular configured as a portioning belt.

The conveyor belt unit can have, viewed in the conveying direction, an effective belt length or conveyor length which amounts to less than 500 mm, in particular less than 300 mm, in particular less than 200 mm, and in particular between 50 mm and 150 mm. The invention makes it possible to realize very short belt conveyors which, for example, only have a length of approximately 100 mm and which in this respect can have a plurality of independent drives. This is in particular of advantage for the design of a removable conveyor belt unit as a portioning unit in which at least one of the conveyors is to have a very short conveying length.

The conveyor belt unit may include a base which is arranged beneath the circulating conveyor belts or conveyor straps and with which the conveyor belt unit can be mechanically attached to a substructure of the belt conveyor. The base so-to-say represents the part of a mechanical interface at the conveyor unit side between the conveyor belt unit and the substructure. The substructure which remains in situ on the removal of the conveyor belt unit can be a component only of the respective belt conveyor, can belong to a higher-ranking conveyor path or can be integrated into a slicing apparatus. The substructure may include a mount adapted to the base of the conveyor belt unit which so-to-say forms the stationary part of the mechanical interface between the conveyor belt unit and the substructure.

In accordance with an embodiment, at least one direct drive for the conveyor belt unit is provided. Such an embodiment manages with a minimal number of components and is consequently extremely inexpensive. It is furthermore hereby possible to attach a plurality of drives to a single removable conveyor belt unit. Such a multidrive opens up a variety of configuration possibilities. It is thus possible, for example, to realize a multitrack operation in which the individual tracks can be driven and controlled independently from one another. This is particularly advantageous for portioning units. It was previously at least extremely expensive and difficult, if not practically impossible, to realize multitrack portioning belts since the hygienic and functional accommodation of a plurality of drives could not be satisfactorily effected.

In accordance with a further embodiment of the invention, at least one drive motor is provided for the conveyor belt unit, with the drive motor being directly coupled to the conveyor belt unit. Such a coupling can take place, for example, via a belt connection by which relatively long paths can be overcome between the motor and that point of the conveyor belt unit at which the latter should be driven or via a toothed wheel arrangement, for example via a toothed wheel pair.

Provision can furthermore be made in accordance with an embodiment of the invention that a drive motor for the conveyor belt unit has a drive shaft and the conveyor belt unit has a drive wheel, with the drive shaft and the drive wheel being directly coupled to one another. This allows a particularly simple and inexpensive design which takes up little room without impairing the function and meets high hygienic demands.

Provision is made in an embodiment that the drive motor is arranged beneath the conveyor belt unit. The width of the belt conveyor is hereby not unnecessarily increased. Construction space provided beneath the conveyor can thus be utilized. It is in particular possible to arrange a plurality of drives beside one another or behind one another beneath the conveyor belt unit.

A further embodiment of the invention proposes that the conveyor belt unit has a supported belt roller, with a drive wheel of the conveyor belt unit being supported via the support of the belt roller. The drive of the conveyor belt unit is hereby further simplified and components are saved in that the support of the belt roller is utilized for the support of the drive wheel.

The drive wheel of the conveyor belt unit is in particular in this respect arranged coaxially to the belt roller and in particular axially beside the band roller. A drive motor cooperating with the drive wheel can thus generally be arranged at any desired point—in particular beneath the conveyor belt unit—which allows a direct coupling to the drive wheel, in particular via a belt connection or via a toothed wheel arrangement. In this respect, it is of particular advantage that it is not necessary to arrange the drive motor or its drive shaft in an axial extension of the belt roller so that an unnecessary widening of the belt conveyor is avoided.

In one embodiment of the invention, a respective relative movement between the drive motor and the conveyor belt unit is provided for cancelling and establishing a coupling between a drive motor for the conveyor belt unit and the conveyor belt unit. This relative movement can be a pivot movement which comprises a purely rotary movement or rotational movement, but can generally also be a more complex movement which is a superposition of a plurality of individual movements.

The drive-wise coupling between the motor and the conveyor unit can thus be cancelled simply by a movement of either the drive motor or of the conveyor belt unit to allow a removal of the conveyor unit.

It is of particular advantage in this concept that the drive motor can remain at the apparatus or at the substructure of the conveying device.

In one embodiment, the spacing between a drive axle of the drive motor and a drive axle of the conveyor belt unit can be varied by the relative movement between the drive motor and the conveyor belt unit. The motor and the conveyor unit are consequently moved relative to one another such that a spacing change is effected between the two drive axles. In particular the spacing between a drive shaft of the drive motor and a drive wheel of the conveyor belt unit can hereby be varied. A drive belt can hereby be relaxed or tautened, for example, or a toothed wheel arrangement can be brought out of engagement or into engagement.

In accordance with an embodiment of the invention, a coupling between a drive for the conveyor belt unit and the conveyor belt unit can be cancelled by relaxing a drive belt and can be established by tautening the drive belt. The relaxing and tautening of the drive belt can in each case take place by a relative movement between the drive and the conveyor belt unit, as already explained above. Such a relative movement is, however, generally not compulsory.

In accordance with a further embodiment of the invention, a mount is provided for the conveyor belt unit which remains at the apparatus when the conveyor belt unit is removed and at which the conveyor belt unit can be latched, with the latched connection being able to be cancelled for removing the conveyor belt unit and being able to be established for installing the conveyor belt unit.

It is possible in a variant of the invention that a coupling between a drive of the conveyor belt unit and the conveyor belt unit can be cancelled or established for removing or for installing the conveyor belt unit simultaneously with a latching of the conveyor belt unit, for example a latching of the conveyor belt unit at a mount remaining at the apparatus, as mentioned above.

It is hereby in particular possibly only to provide a single work process or actuation process with which the latched connection and the coupling are simultaneously cancelled to be able to remove the conveyor belt unit.

Provision can be made in an alternative variant of the invention that the coupling between a drive for the conveyor belt unit and the conveyor belt unit, on the one hand, and a removal movement or installation movement of the conveyor belt unit, on the other hand, are to be carried out simultaneously for the removal or for the installation of the conveyor belt unit, and indeed after the cancelling or before the establishing of a latched connection of the conveyor belt unit.

In this respect, the removal movement or installation movement of the conveyor belt unit is utilized in order simultaneously to cancel or establish the drive-wise coupling. The cancelling or establishing of the latched connection of the conveyor belt unit is a separate process, in contrast.

An actuation device can be provided for a coupling between a drive for the conveyor belt unit and the conveyor belt unit and/or for a latching of the conveyor belt unit at a mount of the apparatus. It can in this respect in particular be a mechanical actuation device to be actuated manually. This represents a particularly reliable and above all also inexpensive variant.

The actuation device can comprise a lever having a shaft, with a drive for the conveyor belt unit, in particular a linkage carrying a drive for the conveyor belt unit, being pivotable about a pivot axis and/or a latching member for the conveyor belt unit being movable between a latched position and a release position by rotating the shaft.

When the actuation device is configured simultaneously to cancel or establish the coupling between the drive and the conveyor belt unit, on the one hand, and the latched connection between the conveyor belt unit and the mount, on the other hand, the shaft which can be set into rotation by means of the lever can be configured in this embodiment such that the drive or the linkage carrying the drive is pivoted and the latching member is moved simultaneously. In accordance with a particularly simple practical implementation, the shaft can be eccentric or can comprise an eccentrically configured section.

When a movement of the conveyor belt relative to the drive takes place for cancelling and established a coupling between a drive for the conveyor belt unit and the conveyor belt unit, it is not necessary that the conveyor belt unit as a whole is moved for this purpose. It is also possible that only an assembly or a component of the conveyor belt unit is moved relative to the drive.

In an embodiment, the conveyor belt unit can be designed for a multitrack operation and can in particular be able to be coupled to a plurality of independent drives which are each associated with at least one track.

In accordance with a further embodiment of the invention, the conveyor belt unit can comprise a plurality of individual conveyors which, viewed in the conveying direction, are arranged behind one another, which in particular follow one another directly and with which a respective separate drive is associated. This embodiment is particularly advantageous when the conveyor belt unit is a portioning unit or a portioning belt. At least one individual conveyor or each individual conveyor can in this respect be configured with one track or for a multitrack operation.

When the conveyor belt unit, which can be removed as a whole, is a portioning belt which comprises two individual conveyors which follow one another and which are each configured with two tracks, a separate drive can be provided for each track of each individual conveyor so that, for example, four drive motors are or can be coupled to the conveyor belt unit which can be operated and controlled independently of one another. The drive motors can, for example, be arranged beneath the conveyor belt unit and can remain at the substructure, in particular at the apparatus, when the conveyor belt unit is removed.

If a plurality of drives are provided for the conveyor belt unit, it is possible in accordance with an embodiment that, viewed in the conveying direction, at least one drive is coupled to the conveyor belt unit at the left hand side and at least one further drive at the right hand side. The drives in this respect may each comprise a drive motor, with the drive motors in particular being arranged, viewed transversely to the conveying direction, beside one another beneath the conveyor belt unit with drive shafts facing outwardly to the respective side.

This concept is particularly advantageous for a two-track slicer since each of the two available sides can be used for the drive of the respective track, i.e. one drive for the left hand track and one drive for the right hand track. This concept can nevertheless also be used for slicers having more than two tracks. Optionally, for this purpose, a staggered arrangement of the drive motors can be provided behind one another, viewed in the conveying direction, to associate a separate drive with each track.

If the conveyor belt unit has a plurality of drives, provision can be made that the coupling between the drives and the conveyor belt unit can be simultaneously cancelled and established at least for a plurality of drives and in particular for all drives. This can take place, for example, by means of a throughgoing shaft which only has to be actuated from one side of the conveyor belt unit, but us simultaneously connected to all drive motors, in particular arranged next to one another viewed transversely to the conveying direction.

The conveyor belt unit can, for example, have a conveying width which lies in the range from approximately 300 mm to 700 mm.

At least one continuous belt or continuous band can be provided as conveying means for the conveyor belt unit, with alternatively a plurality of parallel continuous straps being able to serve as conveying means.

A particularly simple handling of the conveyor belt unit results when, in accordance with a further embodiment, the conveyor belt unit can be removed and/or installed without tools.

Provision can be made in a further embodiment of the invention that the conveyor belt unit can first be moved relative to the mount with a component in or against the conveying direction and can subsequently be raised from the mount for the removal and/or for the installation of the conveyor belt unit with a cancelled latched connection between the conveyor belt unit and a mount remaining at the substructure or at the apparatus. The movement of the conveyor belt unit in or against the conveying direction can provide a particularly stable and secure fastening of the conveyor belt unit to the apparatus mount. In addition, such an embodiment is advantageous when the installation situation does not allow a direct raising or pivoting from the installation position. The conveyor belt unit can then be displaced for the removal before the actual taking out in or against the conveying direction or, on the installation of the conveyor belt unit, such a displacement can be carried out for reaching the final installation position.

Provision can be made in an alternative embodiment that the conveyor belt unit can first be pivoted about one of two supports of the mount and can subsequently be raised from the supports for removing and/or for installing the conveyor belt unit with a cancelled latched connection between the conveyor belt unit and a mount remaining at the substructure or at the apparatus. In this respect, provision can in particular be made that that support which does not serve for the pivoting of the conveyor belt unit is configured for a latching of the conveyor belt unit.

A particularly simple and inexpensive embodiment results when the supports are bar-shaped components. Such an embodiment requires little room, is sufficiently stable and allows, in a construction regard, a simple implementation of the desired pivot movement, on the one hand, and of the cancelling and establishing of the desired latched connection of the conveyor belt unit, on the other hand.

In a further embodiment, a plurality of conveyor belt units can be arranged behind one another and/or beside one another, viewed in the conveying direction. Provision is in particular made in this respect that the conveyor belt units can be removed and/or installed independently of one another.

The invention is consequently not restricted to such apparatus, in particular slicers or conveying devices, in which only a single removable conveyor belt unit is provided.

The invention additionally relates to a conveying device for food products, in particular for food products to be sliced or for sliced food products by means of an apparatus in accordance with any one of the preceding claims, wherein the conveying device comprises at least one belt conveyor which is configured as a removable conveyor belt unit.

Reference is made to the above statements with respect to advantageous further developments of this conveying device. The embodiments of the slicing apparatus disclosed here are herewith also claimed for the conveying device.

BRIEF DESCRIPTION OF THE DRAWINGS

The invention will be described in the following by way of example with reference to the drawing. There are shown:

FIGS. 1 to 5 illustrate different views of a first embodiment of the invention;

FIGS. 11, 12a, 12b, 13a and 13b illustrate different views of a further embodiment of the invention.

DESCRIPTION OF THE EMBODIMENTS

The embodiments of conveyor belt units in accordance with the invention described in the following are components of conveying devices or of slicing apparatus for food products.

The shown belt conveyors each comprise a single individual conveyor or two individual conveyors arranged directly behind one another and are designed for a single-track operation or for a multitrack operation. Each belt conveyor comprises a removable conveyor belt unit 13 and a substructure 41 having a mount 11 for the conveyor belt unit 13, wherein the substructure 41 of the conveyor belt unit can be integrated into a slicing apparatus, in particular into a high-performance slicer, or into a conveying device which is a component of a production line and is in this respect in particular associated with a high-performance slicer.

The embodiments described herein differ with respect to different aspects: FIGS. 1 to 5 describe a single-track traction conveyor in which the conveyor belt unit 13 is configured as a traction belt. Such a traction conveyor is in particular a component of a product supply of a slicer with which one or more food products to be sliced are supplied to a cutting plane together. For example, FIG. 2 illustrates a cutting plane 90.

Figure 7:
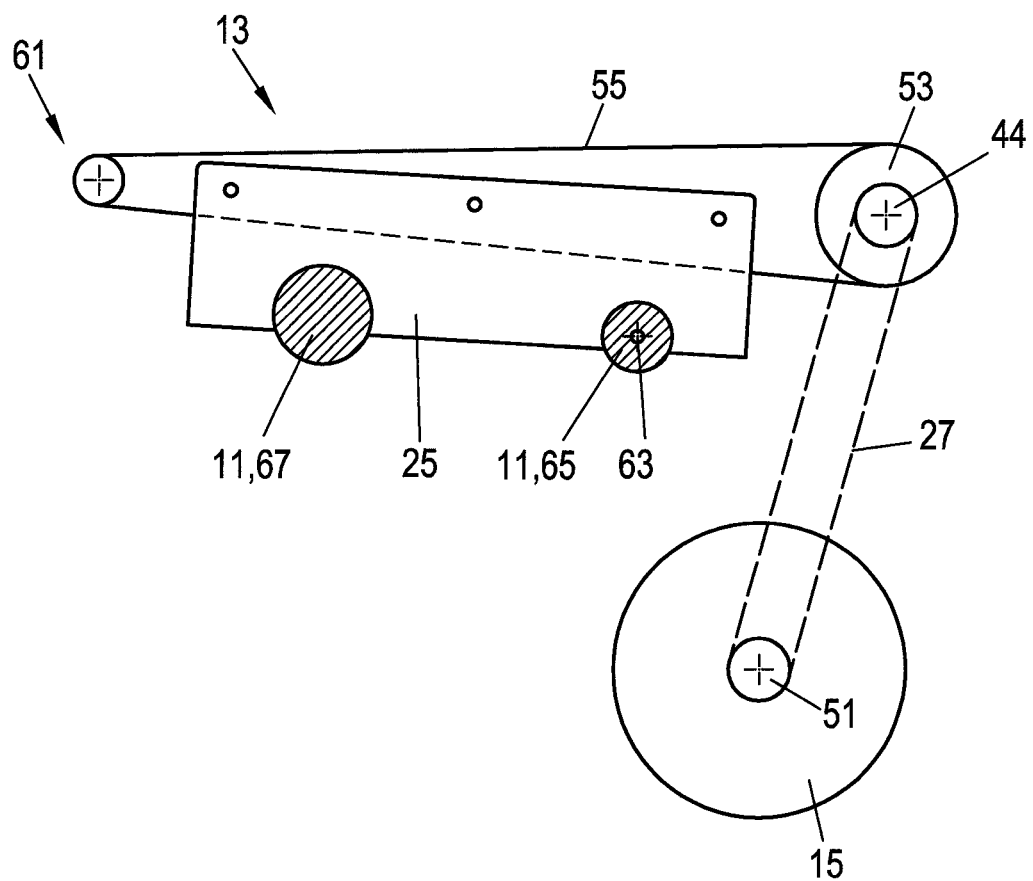
FIG. 7 schematically illustrates a further embodiment of the invention.
Figure 14A:
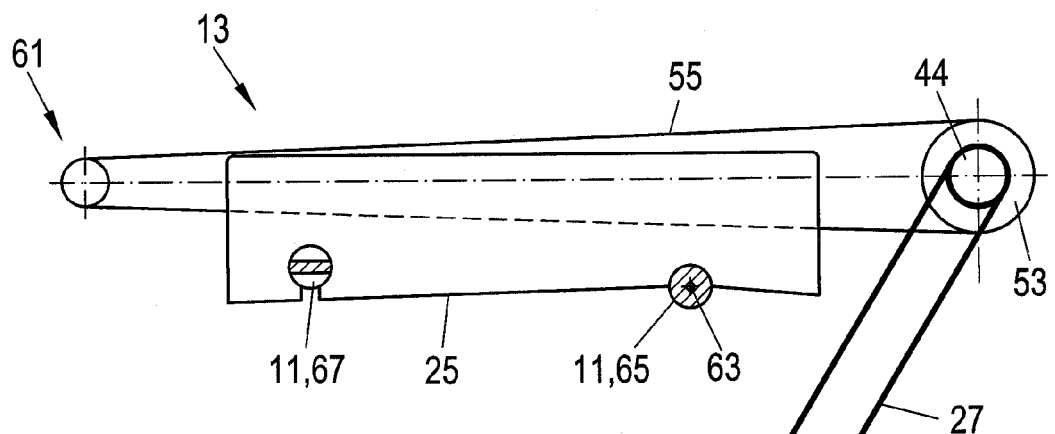
FIGS. 14a and 14b illustrate schematic views of a further embodiment of the invention.
Figure 14B:
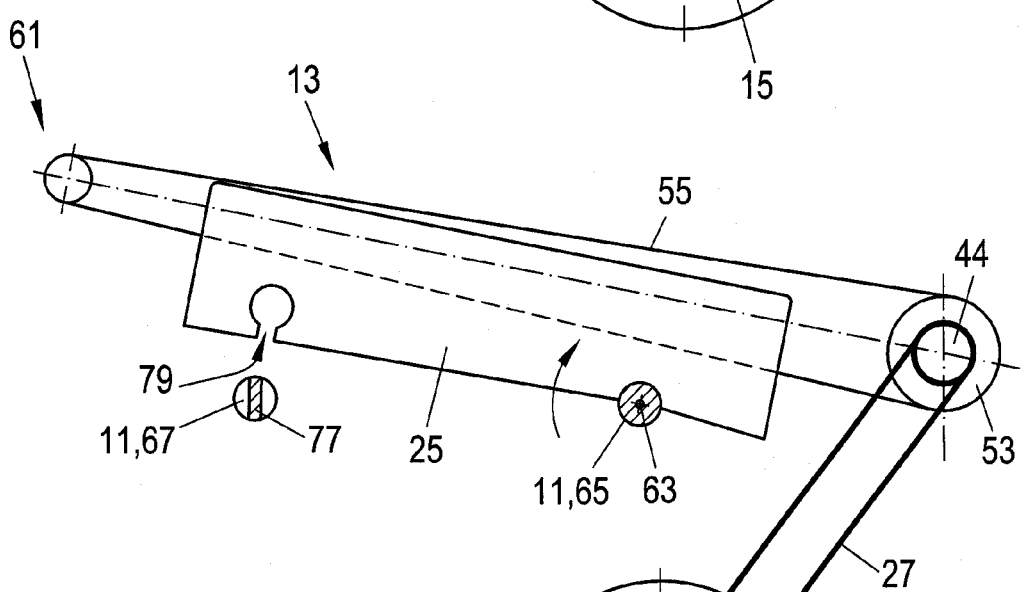

FIG. 7 as well as FIGS. 14a and 14b each schematically show a concept variant in which the coupling between the drive 15 and the conveyor belt unit 13 is effected by a removal movement or installation movement of the conveyor belt unit 13. This coupling or decoupling takes place in the other embodiments in contrast simultaneously with the establishing or cancelling of a latched connection of the conveyor belt unit 13 at the substructure 41.

Figure 8:
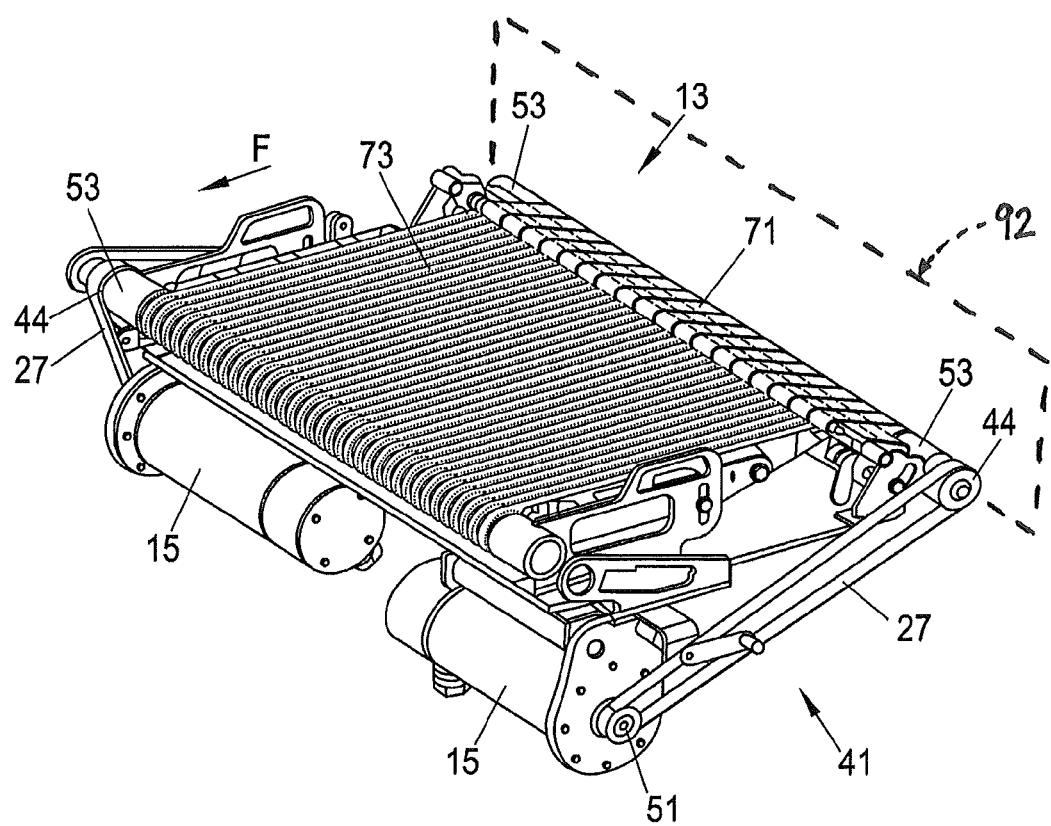
FIGS. 8 to 10 illustrate different views of a further embodiment of the invention.
Figure 9:
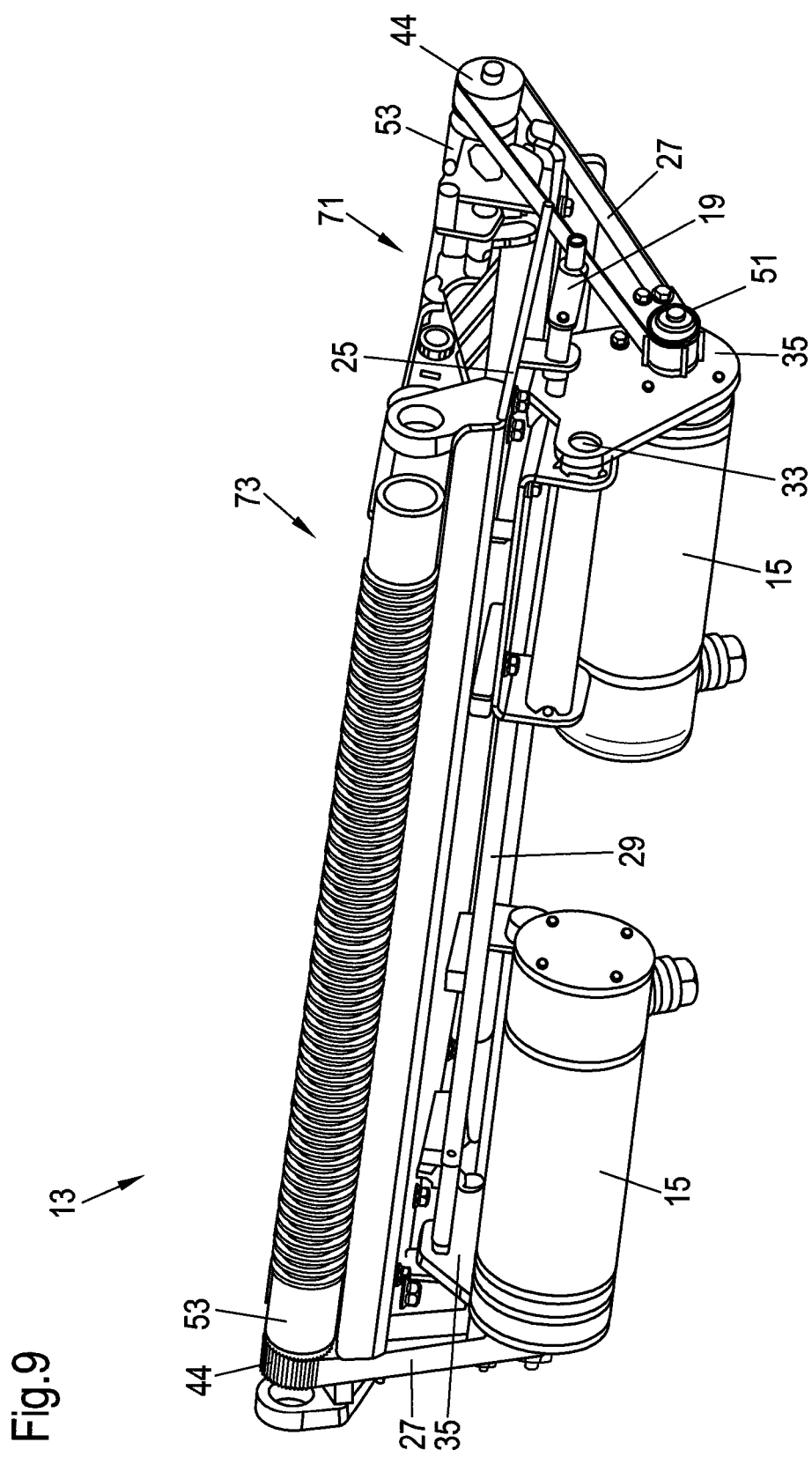
Figure 10:
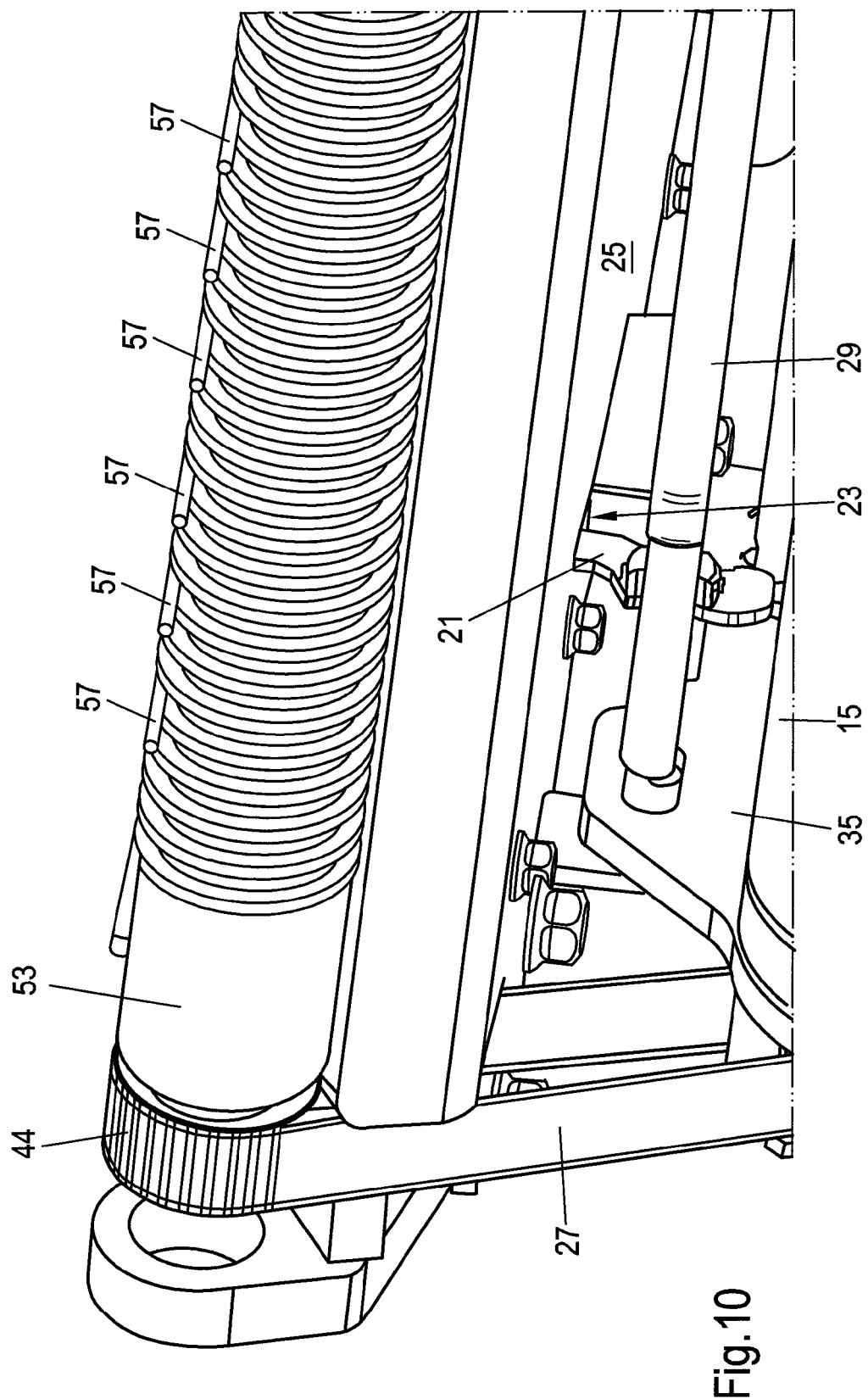

The embodiment of FIGS. 8 to 10 relates to a single-track portioning conveyor in which a single removable conveyor belt unit 13 comprises two individual conveyors, namely a short portioning belt 71 and a long portioning belt 73. FIG. 8 illustrates a cutting plane 92.

The embodiment of FIGS. 11 to 13 shows a two-track traction conveyor having a two-track conveyor belt unit 13.

Figure 3:
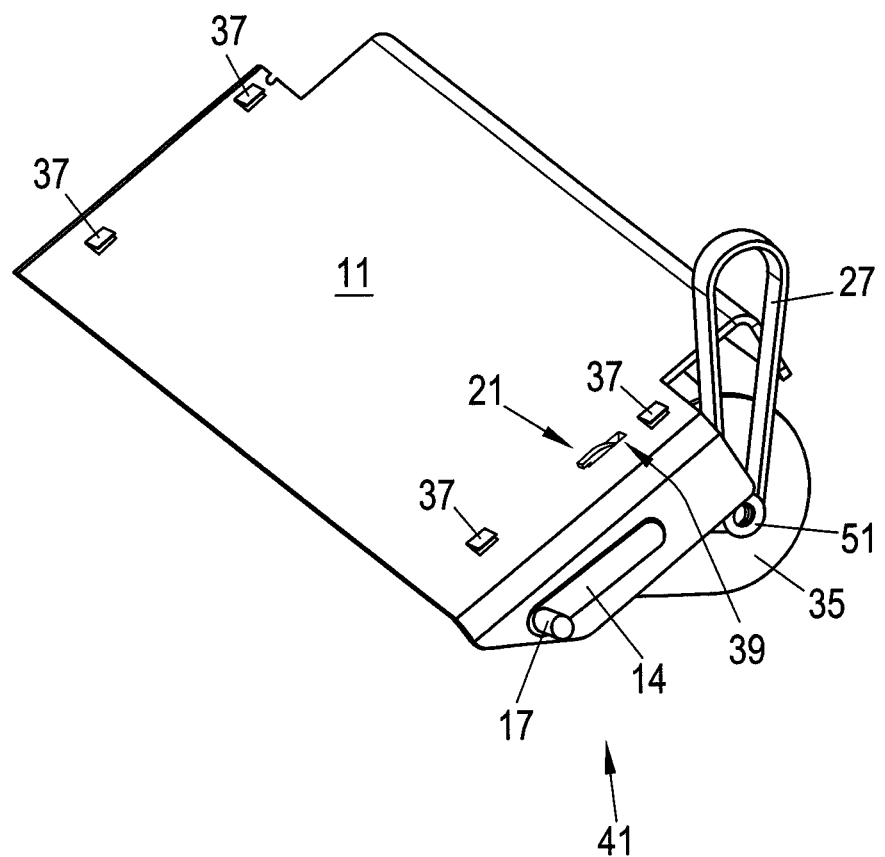

FIG. 1 shows the single-track traction conveyor belt unit in its installation position at a slicer, not shown, with the conveyor belt unit 13 in the installation situation being attached and latched to a mount 11 which is here configured as a table or plate (cf. FIG. 3).

FIG. 2 shows the conveyor belt unit 13 in the removed state.

FIG. 3 shows the mount 11 after removal of the conveyor belt unit 13. The mount 11 is provided at its upper side with coupling elements 37 which are arranged at the left hand marginal region and at the right hand marginal region, which are of mushroom shape and which serve to be engaged behind by a base 25 (cf. FIG. 3) of the conveyor belt unit 13 which is provided with corresponding cut-outs 59 for this purpose.

Furthermore, a slit 39 is formed in the mount 11 at a side in the region between two coupling elements 37, through which slit a latching member 21 extends from below which serves to cooperate with a slit 23 formed in the base 25 of the conveyor belt unit 13 to latch the conveyor belt unit 13 to the mount 11.

The latching member 21 is a component of a latched connection which moreover inter alia comprises a lever 19 having a spigot 17. This actuation device will be described in more detail in the following in connection with FIGS. 4 and 5.

The substructure 41, which includes the mount 11, is furthermore provided with a drive motor for the conveyor belt unit 13 arranged beneath the support 11 and of which only a drive shaft 51 is shown. With an installed conveyor belt unit 13, the drive shaft 51 drives a drive wheel 44 (cf. FIG. 1) of the conveyor belt unit 13 by means of a drive belt 27. The drive wheel 44 is arranged coaxially and laterally beside a belt roller 53 of the conveyor belt unit 13 about which belt roller continuous belts 55 are guided which serve as conveying means and define a product support surface.

In the installed state in accordance with FIG. 1 in which the base 25 of the conveyor belt unit 13 engages behind the coupling elements 37 and is secured by the latched connection 21 and is thus attached to the substructure 41 in a defined operating position, there is consequently a direct drive connection between the drive motor and the conveyor belt unit 13 via the drive belt 27 which runs around the drive shaft 51 of the motor and the drive wheel 44 of the conveyor belt unit 13.

The cooperation between the conveyor belt unit 13 and the substructure 41 is in particular characterized by three processes, namely (i) the movements of the conveyor belt unit 13 required for the removal and for the installation of the conveyor belt unit 13; (ii) the unlatching and the latching of the conveyor belt unit 13; and (iii) the cancelling and the establishing of the coupling between the drive 15 and the conveyor belt unit 13.

Figure 4:
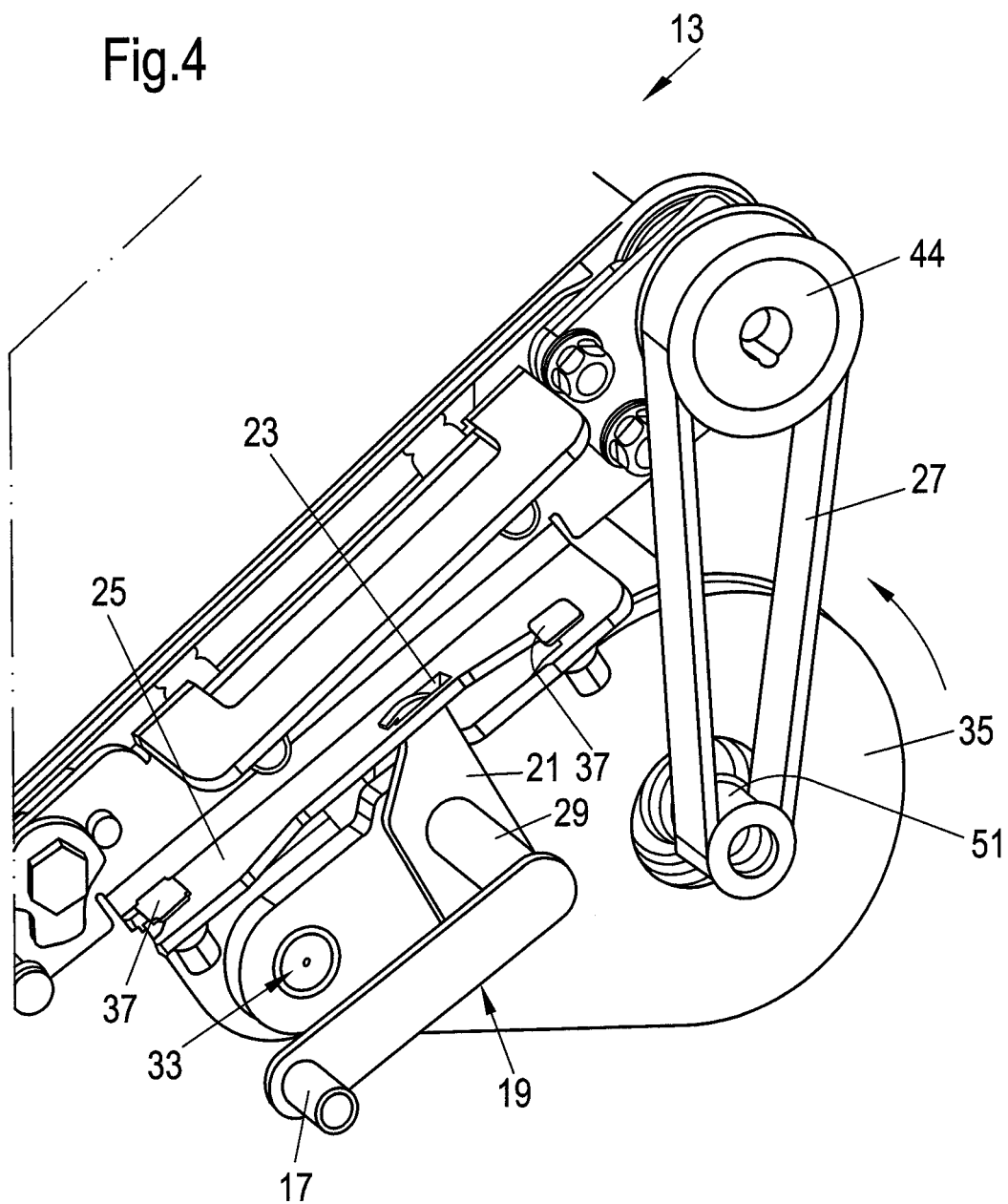
Figure 5:
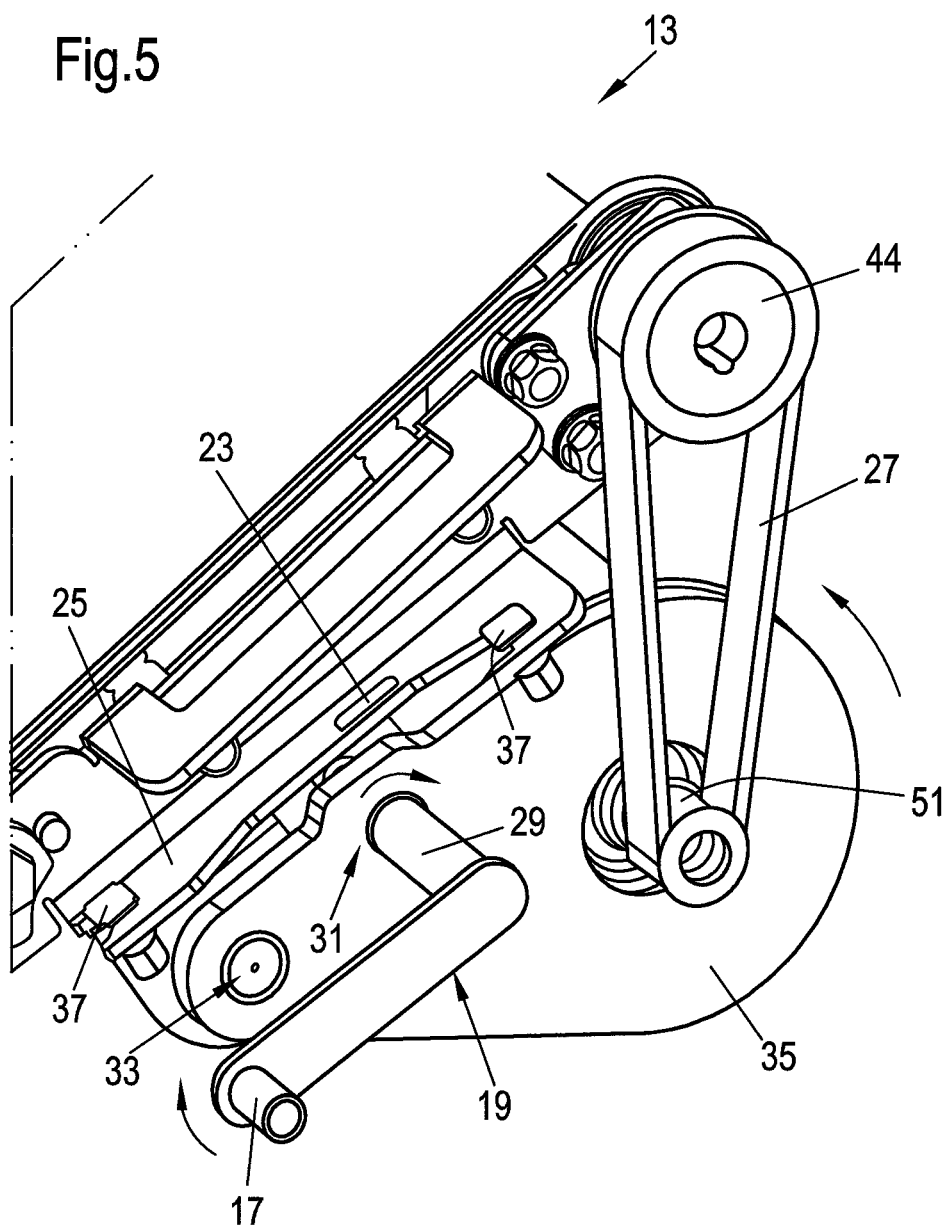

Reference will also be made to FIGS. 4 and 5 for this purpose in the following. FIG. 4 shows the conveyor belt unit 13 in the installed state, with the mount plate 11 having been omitted for better illustration to be able to better show the actuation device. FIG. 5 corresponds to the representation in FIG. 4, with the latching member 21 having additionally been omitted here to be able to better show a shaft 29 of the lever 19.

To be able to remove the conveyor belt unit 13 from the substructure 41 and thus from the mount table 11, the base 25 of the conveyor belt unit 13 has to be brought out of engagement with the coupling elements 37, and indeed by a displacement movement against the conveying direction F (cf. FIG. 1).

This removal movement is only possible when previously both the latched state and the coupling state of the drive 15 have been cancelled, i.e. a removal of the conveyor belt unit 13 is only possible after a previous unlatching of the base 25 and relaxation of the belt 27.

These two processes are carried out simultaneously with the aid of the manual actuation device. For this purpose, the lever 19 is first pulled somewhat outwardly via the spigot 17 by a user, whereby a shape-matched engagement (FIG. 1) of the spigot 17 with the mount 11, which prevents an unintentional unlatching, is cancelled. The lever 19 can then be pivoted by 180° clockwise, for instance, by the user. The latching member 21 initially still seated in the slit 23 of the base 25 hereby releases the base 25 and thus the conveyor belt unit 13. In addition, a linkage 35 which is pivotably supported about an axle 33 and is connected to the drive motor is simultaneously moved counterclockwise by the pivoting of the lever 19, whereby the drive belt 27 can be relaxed and can be removed from the drive wheel 44 of the conveyor belt unit 13.

The pivot movement of the linkage 35 is effected by the concentrically configured shaft 29 of the lever 19 which extends through a cut-out 31 formed in the linkage 35. Consequently, the cut-out 31 of the linkage 35 and the lever shaft 29 in the region of this cut-out 31 are configured such that the shaft 29 so-to-say, in the manner of a crankshaft on rotation due to its eccentricity, pivots the linkage 35 in a defined manner counterclockwise (for relaxing the belt 27) or clockwise (for tautening the belt 27) depending on the direction of rotation.

The pivoting of the lever 19 clockwise therefore has two consequences: On the one hand, an unlatching of the conveyor belt unit 13 takes place; and, on the other hand, a relaxing of the drive belt 27 takes place. Both are necessary to be able to move the conveyor belt unit 13 and thus the base 25 out of engagement with the coupling elements 37 of the mount 11 and then to be able to remove it.

The installation of the conveyor belt unit 13 takes place in reverse order. First, the base 25 of the conveyor belt unit 13 is placed onto the support plate 11 and is then brought into engagement with the coupling elements 37 by a displacement movement in the conveying direction F to engage behind the coupling elements 37 in the region of the cut-outs 59 by means of the base 25. Subsequently, the drive belt 27 is laid around the drive wheel 44 of the conveyor belt unit 13, which is possible in this situation since the drive belt 27 is not yet taut. The lever 19 is thereupon pivoted about approximately 180° counterclockwise back into the starting position in accordance with FIGS. 4 and 5. The linkage 35 is hereby pivoted clockwise, whereby the belt 27 is tautened. At the same time, the hook-shaped free engagement end of the latching member 21 rotationally fixedly connected to the lever shaft 29 is pivoted from below through the slit 23 formed in the base 25 of the conveyor belt unit 13 and is brought into latching engagement with the slit boundary.

The conveyor belt unit 13 is then ready for operation and can be operated in the desired manner by a corresponding control of the drive motor 23.

Reference is also made with respect to this cooperation to the other embodiments also described here (with the exception of the principle explained with reference to FIG. 7 as well as 14a and 14b) which are based on the same basic concept.

Figure 6:
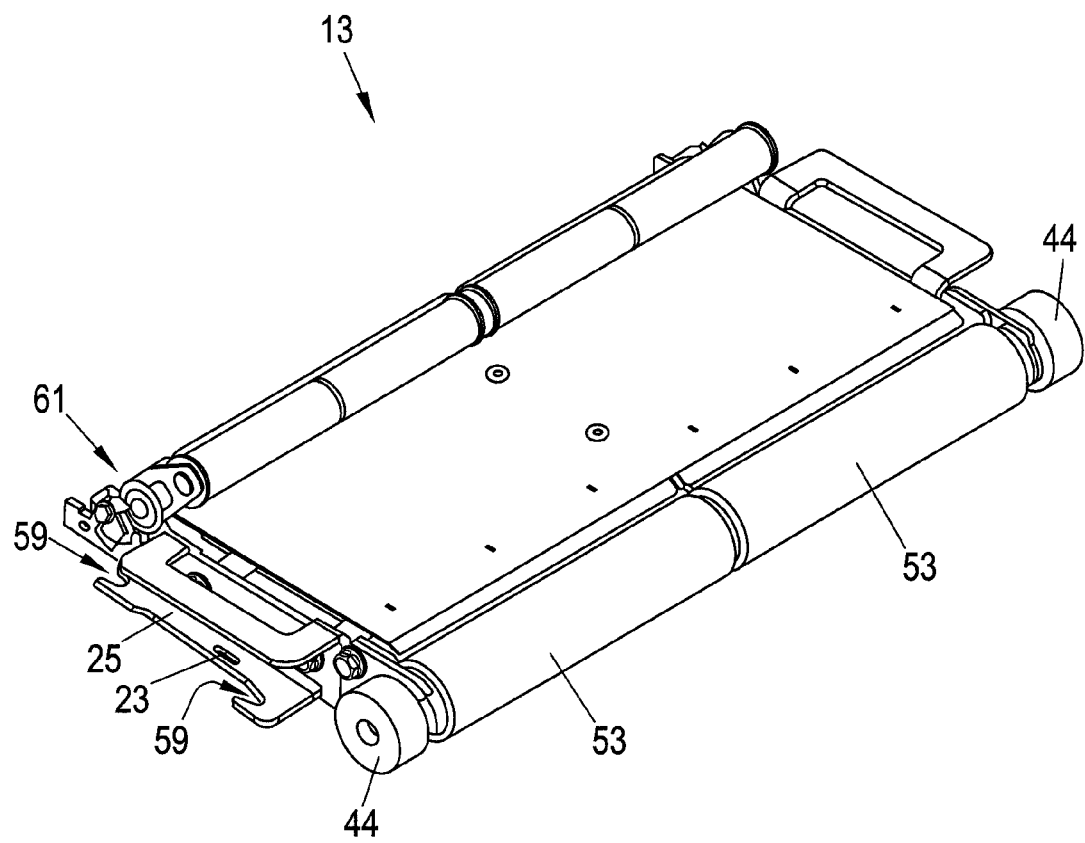
FIG. 6 illustrates a second embodiment of the invention.

The conveyor belt unit 13 shown in the embodiment of FIG. 6 is designed for a two-track operation. The conveyor belt unit 13 is shown here in the removed state and with removed belt conveying bands. Furthermore, a front belt deflection 61 of the conveyor belt unit 13 is shown in a state folded up.

Two belt rollers 53 are arranged axially beside one another and thus lying next to one another on a common axis in the rear drive region of the conveyor belt unit 13. A drive wheel 44, with which a drive motor can be coupled via a drive belt 27, as was likewise described in connection with the embodiment of FIGS. 1 to 5, is associated with each belt roller 53 axially outwardly in accordance with the embodiment of FIGS. 1 to 5.

In addition, as in the embodiment of FIGS. 1 to 5, a base 25 having cut-outs 59 and a slit 23 is arranged at each side of the conveyor belt unit 13 to be able to be latched to a correspondingly configured mount.

The installation situation as well as the removal and the installation of such a two-track conveyor belt unit will be described in more detail in the following in connection with FIGS. 11, 12a, 12b, 13a and 13b.

Whereas an actuation device is provided in the embodiments described above with reference to the Figures in order simultaneously to unlatch or latch the conveyor belt unit and to release or tauten the drive belt, provision is made in the embodiment shown schematically in FIG. 7 that, on the removal of the conveyor belt unit 13, an unlatching of a base 25 of the conveyor belt unit 13 first takes place and only then is simultaneously a removal movement of the conveyor belt unit 13 carried out and the drive belt 27 relaxed.

The mount 11 of the substructure here comprises two support bars 65, 67. The base 25 of the conveyor belt unit 13 is pivotably supported about the support bar 65 at the right here or about its center axis defining a pivot axis 63 for the removal or for the installation.

In the installation position shown, the base 25 of the conveyor belt unit 13 lies on both support bars 65, 67, with the front support bar 67 at the left here additionally being configured to latch the base 25 in the installation situation. This will be looked at in more detail in conjunction with the embodiment of FIGS. 14a, 14b which is likewise based on the above-explained principle.

The relative arrangement of the drive motor 15 with the drive shaft 51, on the one hand, and the drive wheel 44 as well as the belt roller 53 of the conveyor belt unit 13, on the other hand, corresponds to the previously described embodiments. In the present embodiment of FIG. 7, it is, however, a movement of the conveyor belt unit 13 itself which provides a reduction of the spacing between the axis of the drive shaft 51 and the axis of the drive wheel 44 and thus provides a relaxation of the belt 27 for removing the conveyor belt unit 13. Unlike the above-described embodiments in which the drive motor 15 together with drive shaft 51 is moved for the relaxation and tautening of the belt, provision is made in the embodiment of FIG. 7 that the motor 15 is arranged in a stationary manner and the spacing change between the stationary drive shaft 51 and the drive wheel 44 is effected by the explained movement of the conveyor belt unit 13.

The embodiment of FIGS. 8 to 10 shows the implementation of the invention at a portioning conveyor.

The conveyor belt unit 13 is configured as a portioning belt having two individual conveyors 71, 73 arranged, viewed in the conveying direction, directly behind one another. The portioning belt 71 at the rear, viewed in the conveying direction F, on which the product slices cut off during cutting operation fall for forming portions is designed as very short and shorter by a multiple than the following second portioning belt 73 in which a plurality of continuous round belts extending in parallel are provided as conveying means. The first portioning belt 71 has a plurality of parallel narrow belt bands as conveying means.

The substructure 41 of this portioning conveyor is designed differently than, for example, the substructure 41 of the traction belt described in the embodiment of FIGS. 1 to 5. Nevertheless, the unlatching and latching as well as the removal and the installation of the conveyor belt unit 13 at this substructure 41 take place as with the previously described traction belt at least with respect to the basic concept. In FIGS. 8 to 10, a corresponding actuation device is shown having a lever 19 and a throughgoing shaft 29 which carries latching members 21. This will be looked at in more detail in the following.

A special feature of the portioning unit in accordance with FIGS. 8 to 10 is that a single conveyor belt unit 13, which can be handled as a whole and can thus be removed and installed as whole, has more than one belt conveyor, with the plurality of belt conveyors 71, 73—two here—being able to be operated independently of one another since two separate drive motors 15 are arranged at the substructure 41 of this portioning unit which are each associated with one of the portioning belts 71, 73 and can be controlled independently of one another so that the two portioning belts 71, 73 can be operated completely independently of one another.

The two drive motors 15 are integrated in the substructure 41 in a space-saving manner and are thus arranged beneath the conveyor belt unit 13, with the two motors 15 being arranged at the same height, viewed in the conveying direction, and beside one another in the transverse direction and with the drive shafts 51 each facing outwardly.

The two portioning belts 71, 73 each have a belt roller 53 for driving the respective conveying means with which belt roller a respective coaxial drive wheel 44 is associated in accordance with the embodiment of FIGS. 1 to 5. The two drive wheels 44 are each directly connected to one of the drive motors 15, and indeed via a drive belt 27 which runs around the respective drive wheel 44 and the respective drive shaft 51.

This portioning unit in accordance with an embodiment of the invention consequently realizes a high degree of functionality with a very simple and extremely compact basic structure.

In the representation of FIG. 9, in particular the two drive motors 15 can be recognized of which the one drives the short portioning belt 71 and the other drives the long portioning belt 73 via a respective drive belt 27. The direct coupling by means of the drive belts 27 makes it possible to drive belt rollers 53 or drive wheels 44 arranged offset in the conveying direction with drive motors 15 or drive shafts 51 located at the same height, viewed in the conveying direction. This concept consequently utilizes the circumstance that the two drive belts 27 can run on the two mutually opposite sides of the portioning unit and thus without mutual interference or influencing.

The two motors 15 are each fastened to a linkage 35 which is pivotably supported about an axle 33. The linkages 35 are each pivotable by means of a common lever shaft 29 which is connected to a lever 19 on a side of the portioning unit. The shaft 29 is configured eccentric in each case in the region of the linkages 35 such that by rotation of the shaft 29 by approximately 180° by means of the lever 19 a pivot movement of both linkages 35 simultaneously is effected such that both belts 27 are relaxed or tautened simultaneously.

Consequently, by a single manual actuation via the lever 19, a user can simultaneously pivot both motors 15 and can thus decouple both portioning belts 71, 73 simultaneously from their respective drives or couple them to their respective drives. A removal or an installation of this portioning conveyor unit is consequently possible in a fast and simple manner.

The enlarged representation of a part of FIG. 9 in FIG. 10 in particular shows the operation of the lever shaft 19 in the region of the left hand drive motor 15 in FIG. 9. The eccentricity of the shaft 29 in the region of the linkage 35 provides the above-explained pivoting of the motor 15 attached to the linkage 35 on the rotation of the shaft 29. The shaft 29 is furthermore rotationally fixedly connected to two latching members 21 of which only one is shown in FIG. 10. In the installed state shown, the latching member 21 engages through a slit 23 formed in the base 25 of the conveyor belt unit 13 to latch the base 25 and thus the conveyor belt unit 13 to the substructure 41. By rotating the shaft 29 and thus pivoting the latching member 21, this latched connection is cancelled, while simultaneously the belt 27 is relaxed by pivoting the linkage 35.

It can moreover be seen from FIGS. 8 to 10 that the drive belts 27 are each designed as toothed belts and the belt wheels 44 each arranged at the end face of the respective belt roller 53 are each provided in the form of a toothed wheel.

With the two-track traction belt in accordance with FIGS. 11, 12a, 12b, 13a and 13b (cf. also the above statements on FIG. 6), a drive motor 15 which drives the respective belt roller 53 or the end face drive wheel 44 via a belt 27 is provided for each of the two tracks between which a partition wall 69 is arranged here.

This traction belt unit is consequently designed in a mirror image with respect to a center plane between the two tracks which extends perpendicular to the product support surfaces of the continuous belts 55, with both tracks, however, being formed at a single conveyor belt unit 13 which can be handled as a whole.

The removal and the installation of this conveyor belt unit 13, including the latching to the substructure 41 and the relaxing and tautening of the drive belts 27 take place as in the embodiment of FIGS. 1 to 5, which will be explained in more detail in the following.

Figure 12A:
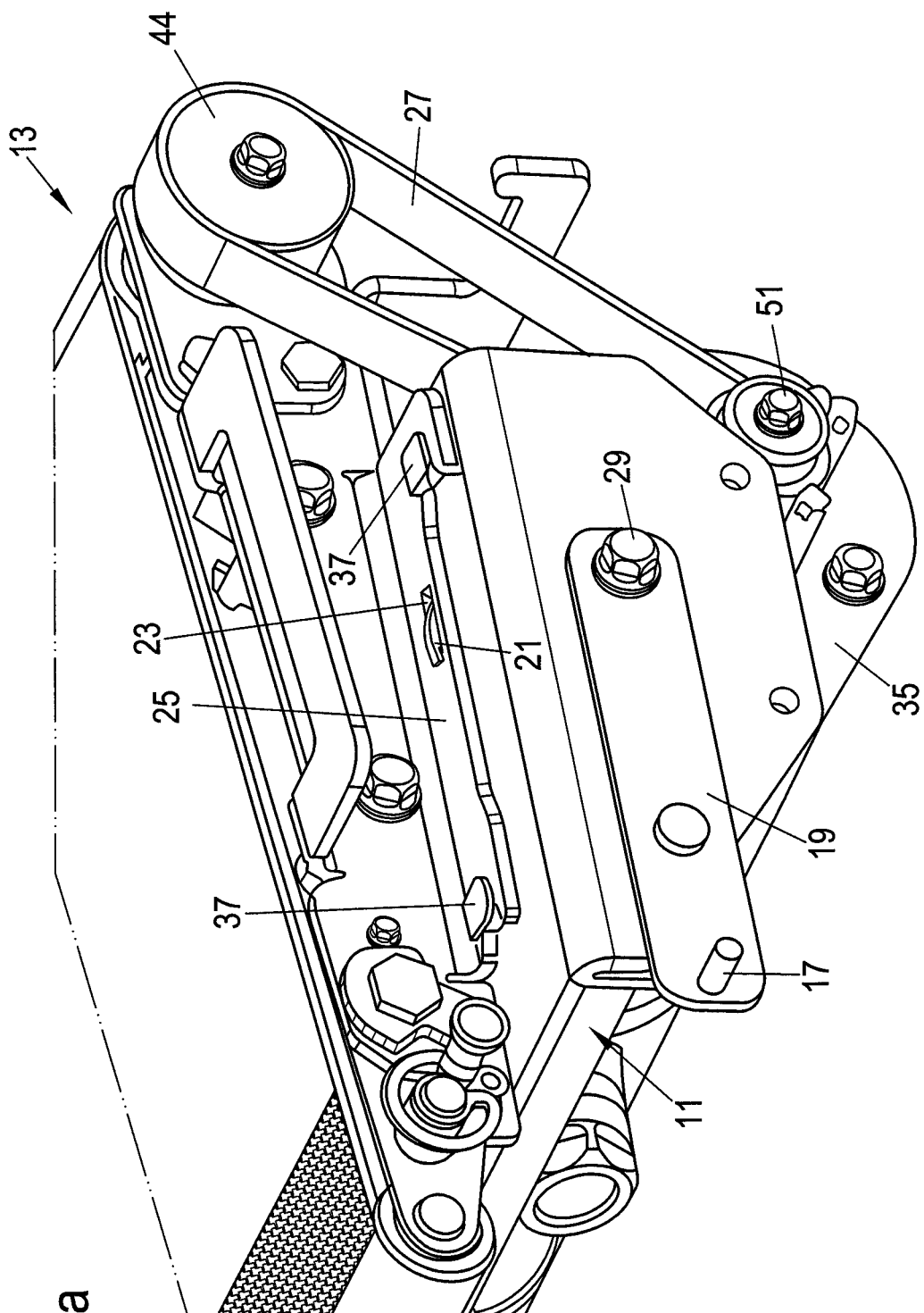
Figure 12B:
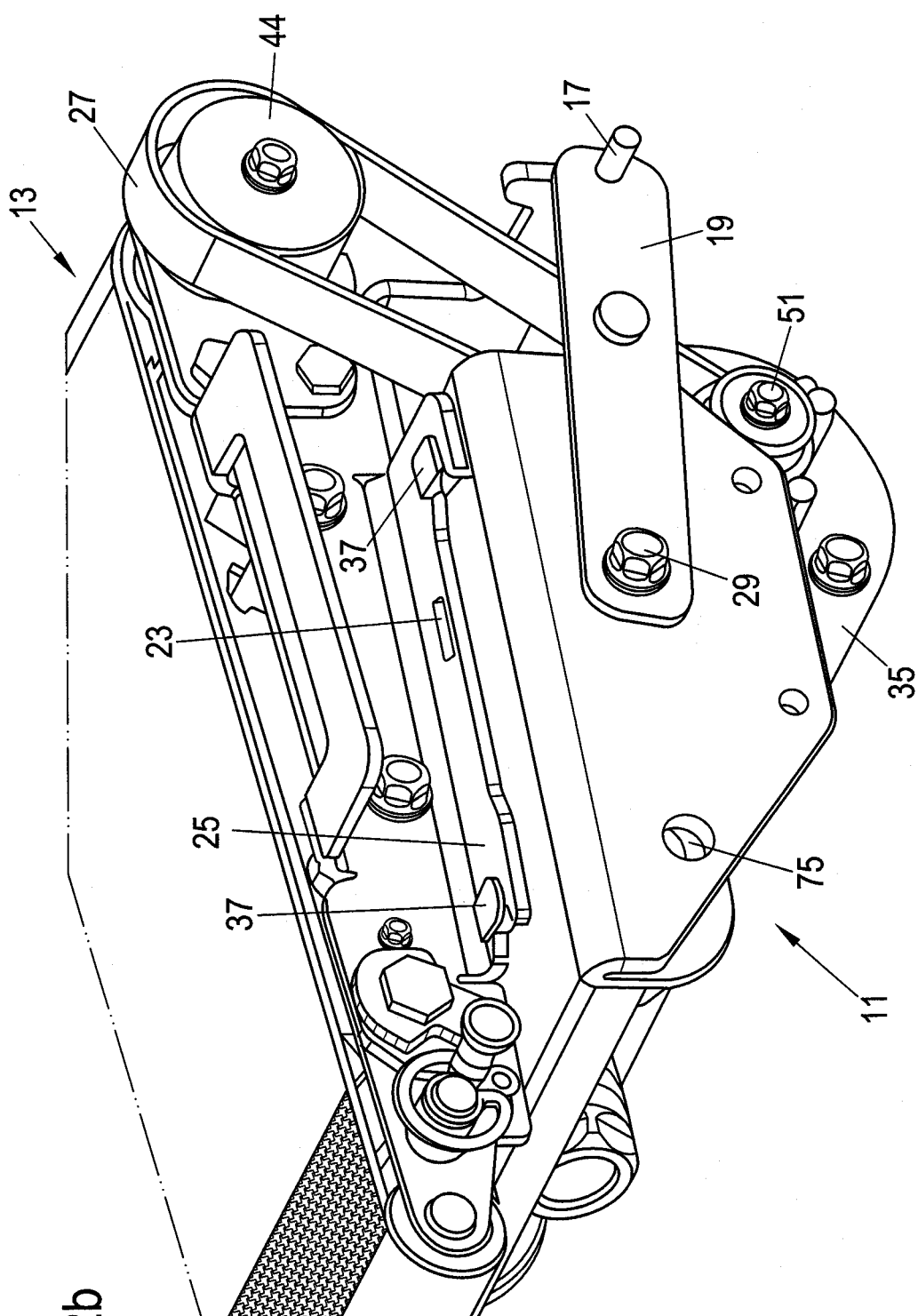
Figure 13A:
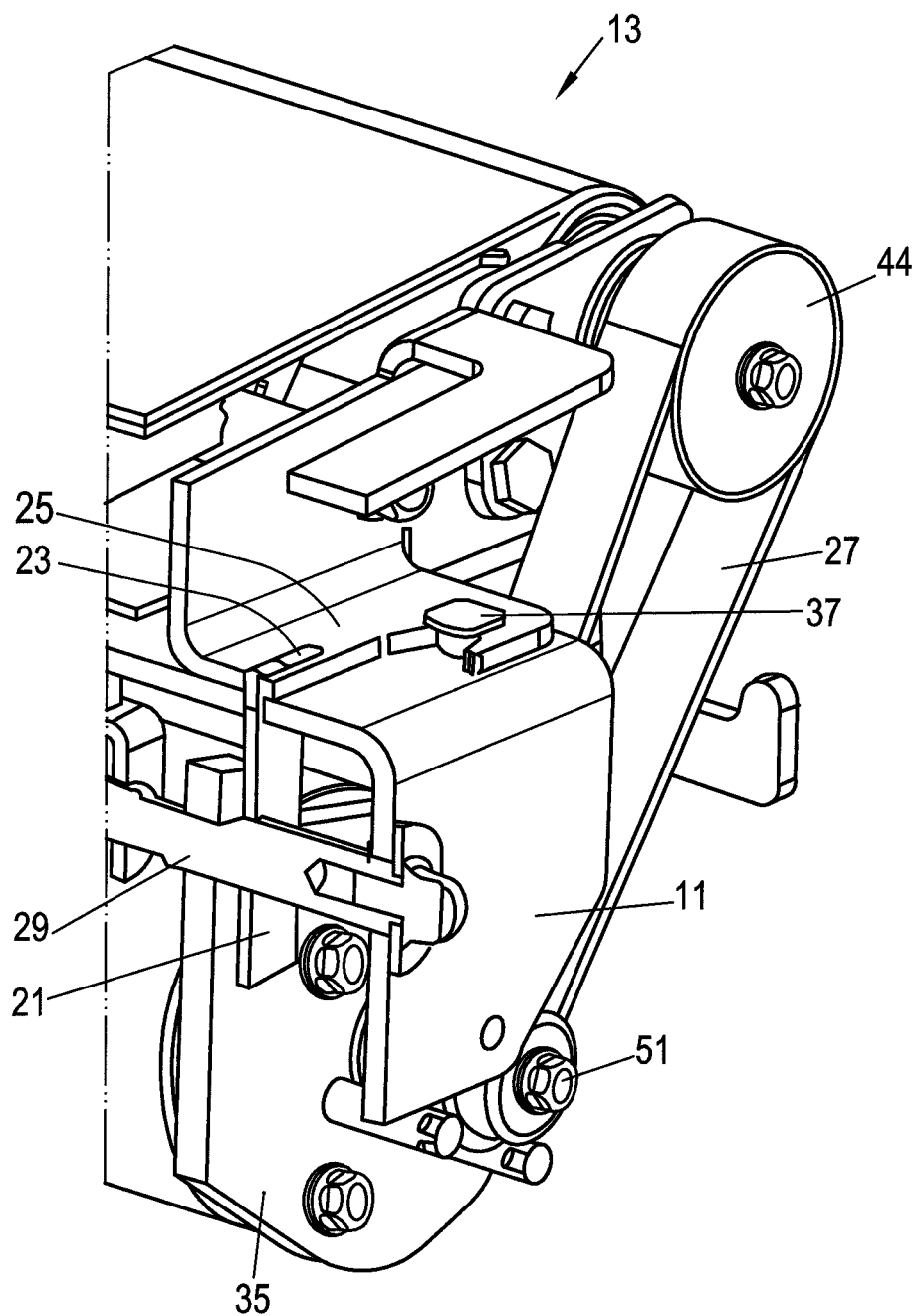
Figure 13B:
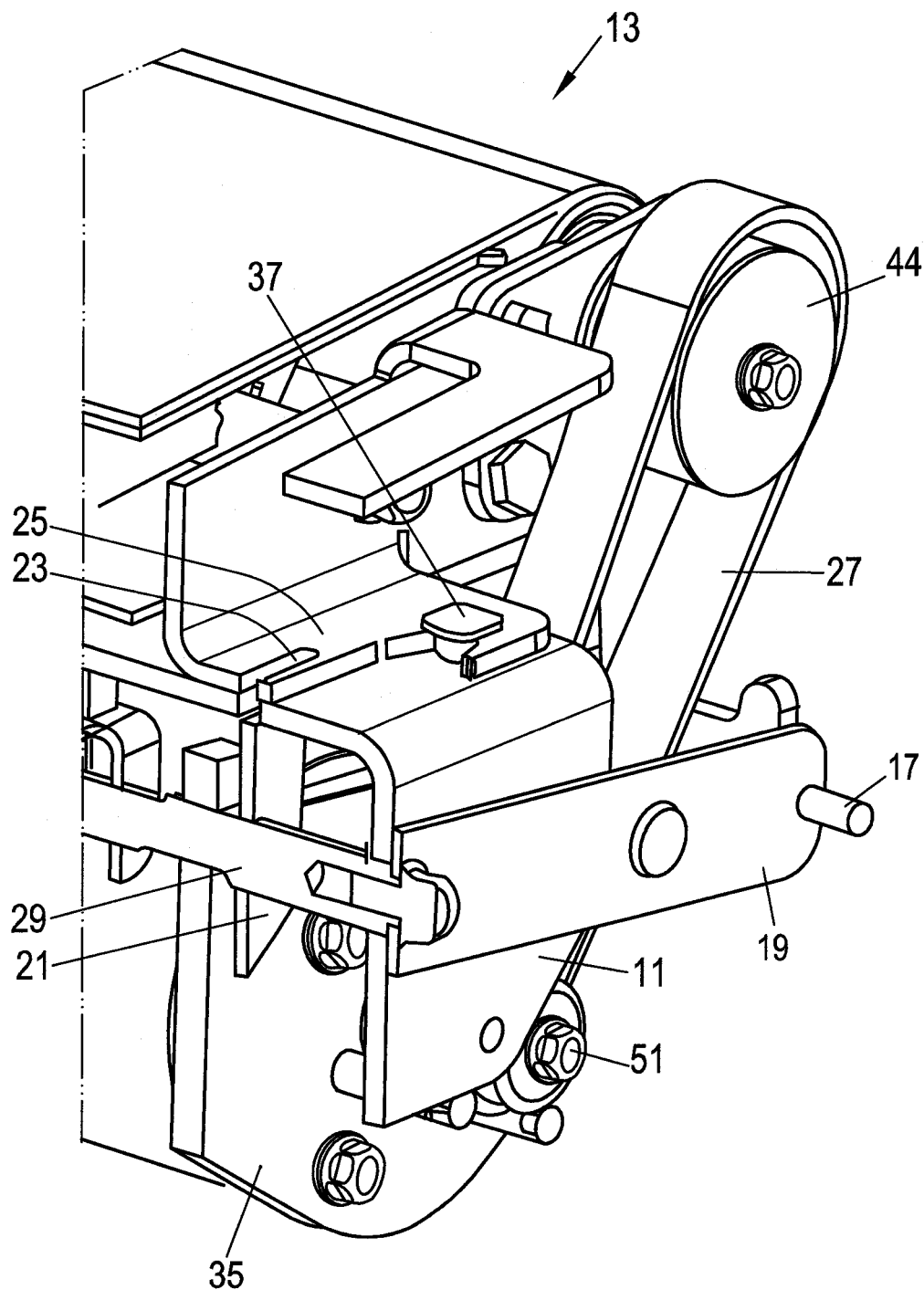

FIGS. 12a and 13a each show the operating position with a tautened drive belt 27, whereas FIGS. 12b and 13b each show a situation in which the drive belts 27 are relaxed and the conveyor belt unit 13 is unlatched, with the base 25 of the conveyor belt unit 13 still being in engagement with the coupling elements 37 of the mount 11.

The comparison of FIGS. 12a and 12b in particular shows that the lever 19 has to be pivoted by approximately 180° clockwise to bring the latching member 21 out of engagement with the slit 23 in the base 25 of the conveyor belt unit 13 and to pivot the linkage 35 counterclockwise to relax the belt 27.

FIGS. 13a and 13b each show a section perpendicular to the conveying direction through the shaft 29 of the lever 19. In particular the eccentric design of the shaft 29 in the region of the linkage 35 and the cooperation of the shaft 29 with the latching member 21 can be recognized, said latching member being in latching engagement with the base 25 of the conveyor belt unit 13 in the region of the slit 23 in the installation situation in accordance with FIG. 13a and being out of engagement with the base 25 of the conveyor belt unit 13 in the unlatched state in accordance with FIG. 13b.

It can additionally be seen from FIGS. 12b and 13b that the belt 27 is relaxed and thus moves out of engagement with the drive wheel 44 or is only laid loosely around the drive wheel 44 by the pivoting of the linkage 35 and thus of the drive shaft 51 of the motor in the direction of the drive wheel 44 of the conveyor belt unit 13 and by the spacing reduction thereby effected between the drive shaft 51 and the drive wheel 44 so that the belt 27 can easily be taken off the drive wheel 44 and the conveyor belt unit 13 can simply be brought out of engagement with the coupling elements 37 of the mount 11 by displacement and can then be raised.

As already mentioned above in conjunction with FIG. 7, FIGS. 14a and 14b schematically show a different removal concept for a conveyor belt unit 13 which can also be configured as a portioning belt or as a traction belt in this concept and which can each be designed either as single track or multitrack.

It is shown purely by way of example in FIGS. 14a and 14b how the support bar 67—at the left here—of the mount 11 or of the substructure 41 can be configured to not only be able to serve as a support for the base 25 of the conveyor belt unit 13, but rather also for latching the conveyor belt unit 13 to the substructure.

For this purpose, the base 25 is provided in the region of a latching section 77 of the support bar 67 with a mount 79 which is shaped in the form of a keyhole and into which the latching section 77 can only move in a rotational position of the support bar 67 corresponding to an unlatched position, as is shown in FIG. 14b.

In the latched position in accordance with FIG. 14a, the latching section 77 located in the mount 79 is oriented such that the latching section 77 cannot move out of the mount 79. The conveyor belt unit 13 is consequently latched and secured in the installation situation or operating position in the state in accordance with FIG. 14a.

To remove the conveyor belt unit 13, the support bar 67 at the left here is first rotated into the position in accordance with FIG. 14b so that the latching section 77 can move out of the mount 79 when the conveyor belt unit 13 is pivoted about the other support bar 65.

This pivoting of the conveyor belt unit 13 effects a spacing reduction between the drive wheel 44 of the conveyor belt unit 13 and the drive shaft 51 of the motor 15, whereby the drive belt 27 is relaxed. The conveyor belt unit 13 pivoted for the purpose of this belt relaxation can then be raised from the support bar 65.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A slicing apparatus for food products, the slicing apparatus comprising:
a removable conveyor belt unit (13) having at least one track and a base (25);
a substructure (41) having a mount (11) coupled to the base (25); and
a drive (15) coupled to the conveyor belt unit (13) by a drive belt (27), the conveyor belt unit (13) is configured to be cancelled by relaxing the drive belt (27) and is configured to be established by tautening the drive belt (27), with the relaxing and tautening of the drive belt (27) each being provided by a relative movement between the drive (15) and the conveyor belt unit (13).

2. The apparatus in accordance with claim 1, wherein the conveyor belt unit (13) is arranged in front of a cutting plane of the slicing apparatus, viewed in the conveying direction.

3. The apparatus in accordance with claim 1, wherein the conveyor belt unit (13) is arranged behind a cutting plane of the slicing apparatus, viewed in the conveying direction.

4. The apparatus in accordance with claim 1, wherein the conveyor belt unit (13) has, viewed in the conveying direction, a belt length or conveyor length which amounts to less than 500 mm.

5. The apparatus in accordance with claim 1, wherein at least one direct drive (15) for the conveyor belt unit (13) is provided.

6. The apparatus in accordance with claim 1, further comprising:
wherein at least one drive motor (15) for the conveyor belt unit (13) is provided, with the drive motor (15) being directly coupled with the conveyor belt unit (13), and/or unit; and
wherein the drive motor (15) is arranged beneath the conveyor belt unit (13).

7. The apparatus in accordance with claim 1, further comprising:
wherein a drive motor (15) for the conveyor belt unit (13) has a drive shaft (51) and the conveyor belt unit (13) has a drive wheel (44), with the drive shaft (51) and the drive wheel (44) being directly coupled to one another; and
wherein the drive motor (15) is arranged beneath the conveyor belt unit (13).

8. The apparatus in accordance with claim 1, further comprising:
wherein the conveyor belt unit (13) has a supported belt roller (53), with a drive wheel (44) of the conveyor belt unit (13) being supported via the support of the belt roller; and
wherein the drive wheel (44) is arranged coaxially to the belt roller (53).

9. The apparatus in accordance with claim 1, further comprising:
wherein a respective relative movement is provided between the drive motor (15) and the conveyor belt unit (13) for cancelling and establishing a coupling between a drive motor (15) for the conveyor belt unit (13) and the conveyor belt unit; and
wherein the spacing between a drive axle of the drive motor (15) and a drive axle of the conveyor belt unit (13) is configured to be varied by the relative movement.

10. The apparatus in accordance with claim 1, wherein a mount (11) is provided for the conveyor belt unit (13) which remains at the apparatus with a removed conveyor belt unit (13) and at which the conveyor belt unit (13) is configured to be latched, with the latched connection configured to be cancelled for removing the conveyor belt unit (13) and configured to be established for installing the conveyor belt unit (13).

11. The apparatus in accordance with claim 1, wherein a coupling between a drive (15) for the conveyor belt unit (13) and the conveyor belt unit (13) is configured to be cancelled or established simultaneously with a latching of the conveyor belt unit (13) for removing or installing the conveyor belt unit (13).

12. The apparatus in accordance with claim 1, wherein the coupling between a drive (15) for the conveyor belt unit (13) and the conveyor belt unit (13) is configured to be carried out simultaneously with a removal movement or installation movement of the conveyor belt unit (13) after the cancelling or before the establishing of a latched connection of the conveyor belt unit (13) for removing or for installing the conveyor belt unit (13).

13. The apparatus in accordance with claim 1, further comprising:
wherein the conveyor belt unit (13) comprises a plurality of individual conveyors (71, 73) which are arranged, viewed in the conveying direction, behind one another and with which a separate drive (15) is associated; and
wherein viewed in the conveying direction, at least one drive (15) is coupled to the conveyor belt unit (13) at the left side and at least one further drive (15) at the right side.

14. The apparatus in accordance with claim 1, wherein the conveyor belt unit (13) has a conveying width in the range from approximately 300 mm to 700 mm.

15. The apparatus in accordance with claim 1, wherein at least one continuous belt or continuous band (55) or a plurality of parallel continuous straps (57) is/are provided as conveying means of the conveyor belt unit (13).

16. The apparatus in accordance with claim 1, wherein the conveyor belt unit (13) is configured to be removed and/or installed without tools.

17. The apparatus in accordance with claim 1, further comprising:
wherein a plurality of conveyor belt units (13) are arranged behind one another viewed in the conveying direction; and
wherein the plurality of conveyor belt units are arranged beside one another, viewed in the conveying direction.

18. A conveying device for food products to be sliced or for sliced food products, the conveying device comprising at least one removable conveyor belt unit (13), having at least one track and a base (25);
a substructure (41) having a mount (11) provided with coupling elements (37) that engage corresponding cutouts (59) of the base (25); and
a drive (15) arranged at the substructure (41), the drive (15) connected to a drive shaft (51) that drives a drive wheel (44) of the conveyor belt unit (13) by a drive belt (27).

19. A slicing apparatus for food products, the slicing apparatus comprising at least one removable conveyor belt unit (13) having at least one track and a base (25);
a substructure (41) having a mount (11) coupled to the base (25);
a drive (15) coupled to the conveyor belt unit (13) by an actuation device, the actuation device having a lever (19), a shaft (29) extending from the lever (19), a latching member (21) extending from the shaft (29) that cooperates with a slit (23) formed in the base (25) to latch the conveyor belt unit (13) to the mount (11), and a linkage (35) carrying the drive (15) for the conveyor belt unit (13) being pivotable about a pivot axis (33) by rotating the shaft (29) to move the latching member (21) between a latched position and a release position; and
a drive belt (27) that runs around a driveshaft (51) of the drive (15) and a drive wheel (44) of the conveyor belt unit (13), the conveyor belt unit (13) is configured to be cancelled by relaxing the drive belt (27) and is configured to be established by tautening the drive belt (27), with the relaxing and tautening of the drive belt (27) each being provided by a relative movement between the drive (15) and the conveyor belt unit (13).

20. A slicing apparatus for food products, the slicing apparatus comprising at least one removable conveyor belt unit (13) having at least one track and a base (25);
a substructure (41) having a mount (11) coupled to the base (25); and
an actuation device that is provided as a coupling that is configured to be cancelled and established between a drive (15) for the conveyor belt unit (13) and the conveyor belt unit (13), and is configured as a latching of the conveyor belt unit (13) to the mount (11), the actuation device comprises
a lever (19) having a shaft (29);
a linkage (35) carrying a drive (15) for the conveyor belt unit (13) being pivotable about a pivot axis (33) by rotating the shaft; and
a latching member (21) for the conveyor belt unit (13) being movable between a latched position (21) and a release position.

21. A slicing apparatus for food products, the slicing apparatus comprising:
at least one removable conveyor belt unit (13) having at least one track and a base (25); and
a substructure (41) having a mount (11) coupled to the base (25), the conveyor belt unit (13) is movable relative to the drive (15) for cancelling and establishing a coupling between a drive (15) of the conveyor belt unit (13) and the conveyor belt unit (13), and the conveyor belt unit (13) is movable by at least one of folding over and pivoting.

22. A slicing apparatus for food products, the slicing apparatus comprising:
at least one removable conveyor belt unit (13) having at least one track and a base (25);
a substructure (41) having a mount (11) coupled to the base (25); and
a first drive (15) is coupled to the conveyor belt unit (13) at the left side and at a second drive (15) at the right side, when viewed in the conveying direction, the coupling between the drives (15) and the conveyor belt unit (13) is configured to be simultaneously cancelled and established for at least one of the first drive (15) and the second drive (15).

23. A slicing apparatus for food products, the slicing apparatus comprising:
at least one removable conveyor belt unit (13) having at least one track and a base (25); and
a substructure (41) having a mount (11) coupled to the base (25), the conveyor belt unit (13) is configured to first be movable with a component in or against the conveying direction relative to the mount (11) and is configured to subsequently be raised from the mount (11) for at least one of removing and installing the conveyor belt unit (13) with a cancelled latched connection between the conveyor belt unit (13) and a mount (11) remaining at the apparatus.

24. A slicing apparatus for food products, the slicing apparatus comprising:
at least one removable conveyor belt unit (13) having at least one track and a base (25); and
a substructure (41) having a mount (11) coupled to the base (25), the conveyor belt unit (13) is configured to first be pivoted about one of two supports (65, 67) of the mount (11), and is configured to subsequently be raised from the supports (65, 67) for at least one of removing and installing the conveyor belt unit (13)

with a cancelled latched connection between the conveyor belt unit (13) and a mount (11) remaining at the apparatus.

\* \* \* \* \*